United States Patent [19]
Koike

[11] Patent Number: 5,301,361
[45] Date of Patent: Apr. 5, 1994

[54] LOW PARTS COUNT TRANSMITTER UNIT

[75] Inventor: Yukinaga Koike, Matsumoto, Japan

[73] Assignee: Samson Technologies, Hicksville, N.Y.

[21] Appl. No.: 635,926

[22] Filed: Dec. 28, 1990

[51] Int. Cl.$^5$ .............................................. H04B 1/04
[52] U.S. Cl. ..................................... 455/95; 455/112; 455/118; 455/124
[58] Field of Search ................. 455/95, 127, 118, 107, 455/100, 102, 112, 113, 119, 124, 125; 332/141

[56] References Cited

U.S. PATENT DOCUMENTS

| | | | |
|---|---|---|---|
| 2,840,694 | 6/1958 | Morgan | 455/95 |
| 3,564,416 | 3/1968 | Price | 455/95 |
| 4,864,636 | 9/1989 | Brunius | 455/118 |

Primary Examiner—Reinhard J. Eisenzopf
Assistant Examiner—Chi Pham

[57] ABSTRACT

A frequency modulated (FM) transmitter for use in the 100 to 300 megacycle band is described having a low parts count topology. The disclosed topology requires the use of five tank circuits tuned to various frequency multiples of a crystal oscillator to achieve a twelve fold multiplication of the natural frequency of the crystal oscillator.

18 Claims, 5 Drawing Sheets

LOW PARTS COUNT TRANSMITTER UNIT

FIELD OF THE INVENTION

The present invention relates to a wireless microphone system having a transmitter and receiver units remotely positioned from each other wherein frequency modulated (FM) signals representing audible sounds are transferred from the transmitter unit to the receiver unit. The receiver unit reproduces the audible sounds in response to the received signals. In particular, the present invention pertains to a transmitter unit of the above wireless microphone system.

BACKGROUND OF THE INVENTION

A typical wireless microphone system of the prior art comprises a transmitter unit which, as shown in FIG. 2, has:
a) a low frequency amplifier 1 for amplifying audio signal output such as from an electric guitar,
b) a signal logarithmic compression circuit 2, (a noise reduction circuit for reducing the effect of noise during transmission),
c) a frequency modulator 3 for modulating the amplitude of the logarithmically compressed signal,
d) multiplier circuits 4, 5 for multiplying the frequency of the modulated signal from the modulator 3
e) a power amplifier 6 for amplifying the power of the resultant frequency modulated signal, and
f) an antenna 8 for transmitting the amplified signal to a receiver (not shown).

As shown in FIG. 1, the frequency modulator 3 of the prior art has a crystal resonator (Xtal) which oscillates at its natural frequency (fundamental frequency), fo. The frequency fo is supplied to the gate of field-effect transistor F1 of the frequency modulator 3. The frequency modulator 3 is a modification of a fixed quartz oscillator or Sabaroff oscillator, and its drain tank circuit 32 (C tap type) tunes to a frequency which is three times as high as the natural frequency fo. Since the linearity of the FM modulator becomes degraded if the modulation index mf becomes high, the modulation index is controlled to be low. In the multiplying stages, multiplication is carried out so as to obtain a desired modulation index mf. According to the conventional transmitter of FIG. 1, a multiplied (double) frequency is output from the 2×multiplier circuit 4. Likewise, another doubling of frequency is output from the 2×multiplier circuit 5. Thus, the resulting carrier frequency is 12 times as high as the natural frequency of the crystal Xtal and is supplied to the power amplifier 6.

A transmitter of the above type is typically carried, for example, by a person making a speech to a large audience. Here the transmitter is worn by the speaker and the sound of his voice is transmitted to a receiver. Because portability is important, there is strong demand to make the unit light in weight and compact in size. In addition, if the transmitter unit is installed on a music instrument such as an electric guitar, the price of the unit must be much lower than that of the guitar itself. In order to satisfy these size and cost constraints, the transmitter unit should have as few parts as possible, without degrading its electrical characteristics.

SUMMARY OF THE INVENTION

Accordingly, an object of the present invention is to provide a light and compact transmitter unit of a wireless microphone system of enhanced portability and cost effective price by reducing stages of frequency-multiplying circuitry prevalent in the prior art.

Another object of the present invention is to provide a transmitter unit of an FM wireless microphone system that is more reliable as compared to the prior art because it has fewer components.

The various objectives and advantages of the invention are realized in an arrangement where the transmitter unit of a frequency modulated (FM) wireless microphone system, using a radio frequency carrier operating between 100 and 300 megacycles and having a ground voltage reference point, is made up of various major components. First is an audio input mechanism. This input mechanism is made up of the center conductor of a coaxial cable connected to a low pass filter. The low pass filter is made to block signals having frequency components outside the audio band, typically larger than 20,000 hertz. This low pass filtered audio signal is fed to an audio amplifier of conventional topology and characteristics.

The output of the audio amplifier is used by a logarithmic compression circuit connected to the output of the audio amplifier. The logarithmic compression circuit compresses the audio signal to improve its signal to noise ratio. The output from the logarithmic compression circuit is presented to a frequency modulation unit.

The frequency modulation circuit is made up of a first transistor, having a first collector, a first emitter and a first base. A crystal resonator is connected to the first base. A first tank circuit is connected to the first first emitter, while a second tank circuit is connected to the first collector. The first tank circuit is tuned to the fundamental frequency of the crystal resonator, while the second tank circuit is tuned to a frequency six times that of the crystal resonator.

A first coupling capacitor (C34, in FIG. 3) is connected to the first collector. The other end of the coupling capacitor presents the output of this stage to a third tank circuit. The third tank circuit is also connected to the ground reference point. This third tank circuit is tuned to twice the fundamental crystal oscillator frequency.

The output derived from the coupling capacitor above is connected to a R.F. power amplifier. This R.F. amplifier is made up of a second transistor having a second base, a second emitter and a second collector. A fourth tank circuit is connected to the second collector. This fourth tank circuit is tuned to twice the frequency presented to the base of the second transistor.

A second coupling capacitor (C33 in FIG. 3) is connected to the second collector. This capacitor couples the output of the power amplifier to a fifth tank circuit connected between the ground reference and the output from the power amplifier. This fifth tank circuit is tuned to the same frequency as the fourth tank circuit. Another coupling capacitor (C90 in FIG. 3) connects the junction of the second coupling capacitor C33 and the fifth tank circuit, with an inductor connected to ground. This inductor is designed to shunt low frequencies to ground. Thus low pass filtered, the output of the amplifier is placed onto the outer sheath of the coaxial cable whose internal conductor is used for carrying the audio information into the audio amplifier as described above.

BRIEF DESCRIPTION OF THE DRAWINGS

Features of the invention which are believed to be novel are set forth with particularity in the appended claims. The invention itself however, together with its further objects and advantages thereof, may best be understood by reference to the following description, when taken in conjunction with the accompanying drawings, in which:

PREFERRED EMBODIMENT

Figure 3:
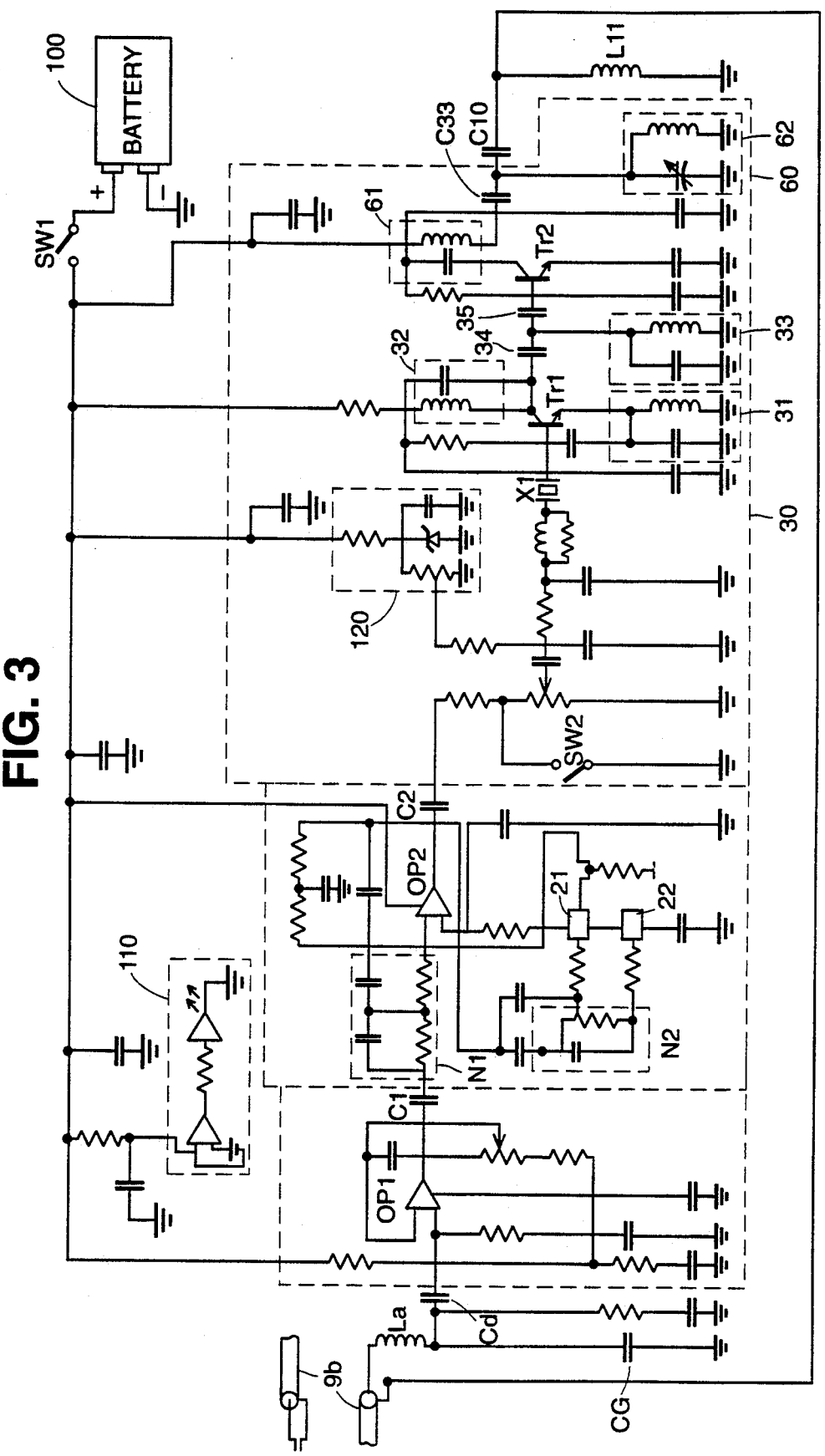
Figure 4:
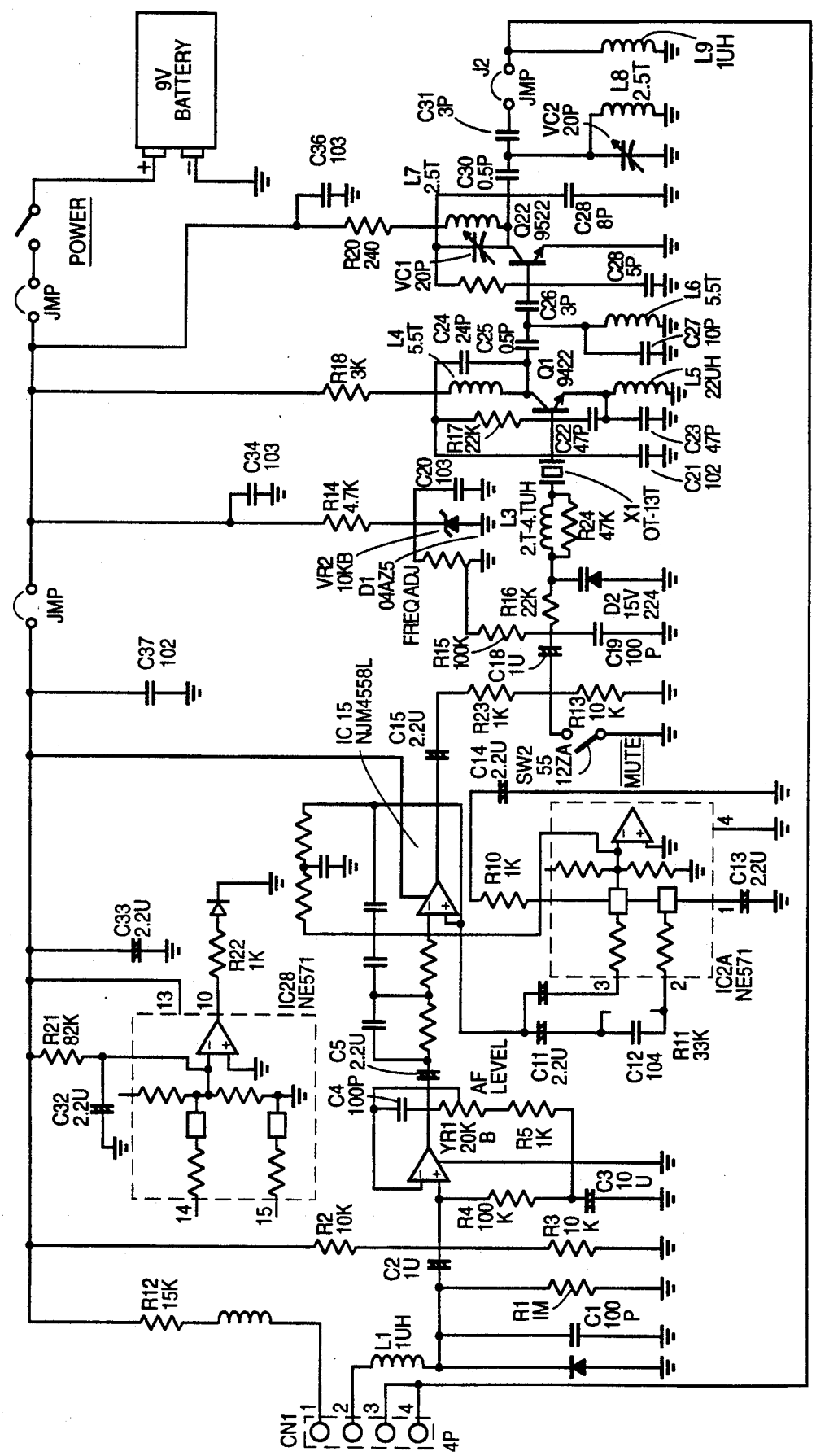
FIG. 4 is a schematic diagram of a frequency modulated (FM) transmitter implementing the building blocks shown in FIG. 3 and applying the teachings of this invention. Actual values for each element are shown to detail the operation of a transmitter in the 174.6 to 213.2 Megacycle range.
Figure 5:
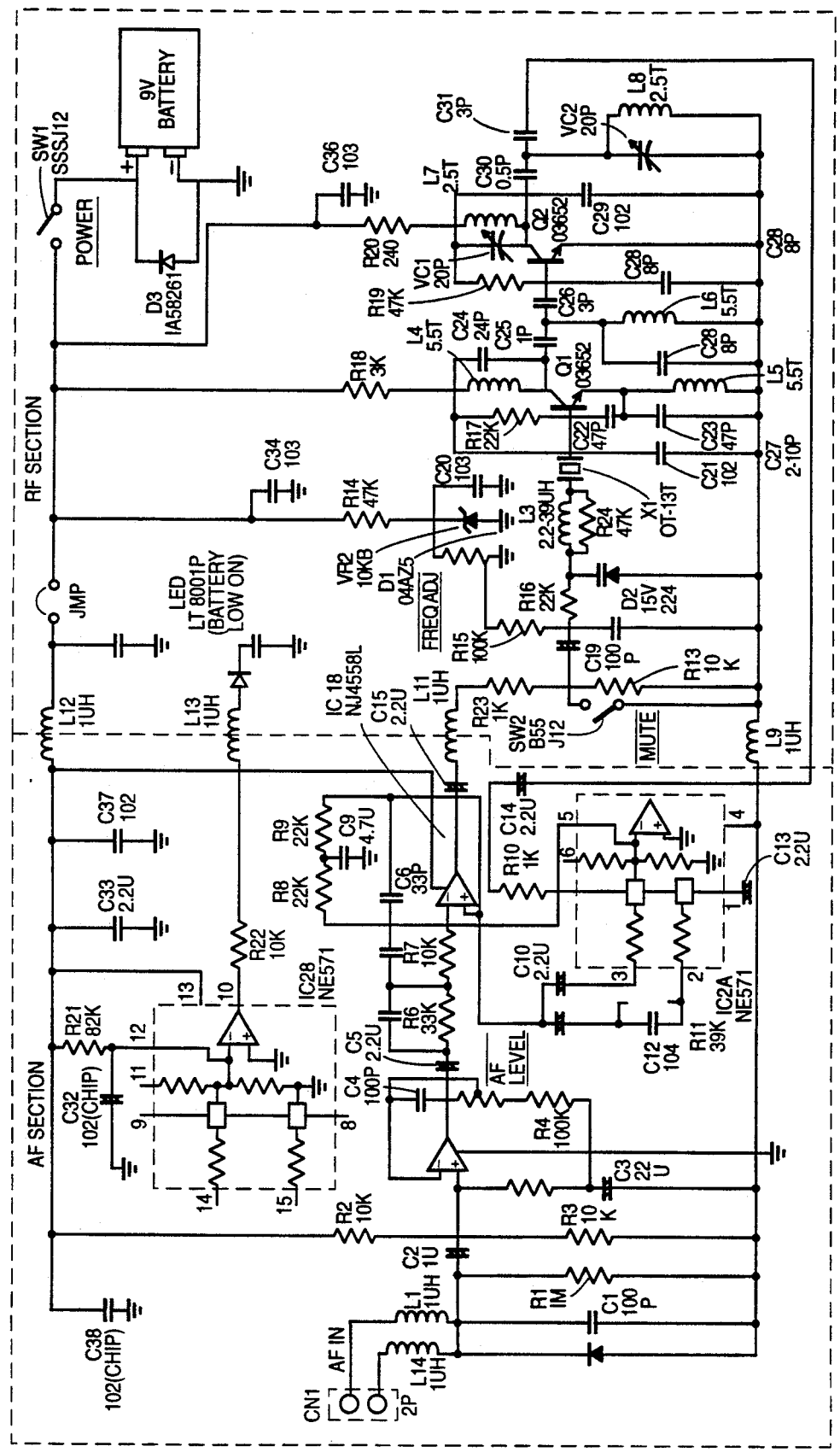
FIG. 5 is yet another schematic of a frequency modulated transmitter showing the application of the improvements thought by the present invention.

FIG. 3 is a schematic diagram of a transmitter unit of a wireless microphone system according to the present invention. The unit comprises a low-frequency amplifier 10, a logarithmic compression circuit 20, a frequency modulation circuit 30 and a power amplifier 60 and can typically be used in the 100 to 300 Megacycle band, although the concepts shown herein can be extended further to cover other frequencies.

Audio signals input from an RCA type phono plug 9a and a coaxial cable 9b are supplied to the low frequency amplifier circuit 10 via a high frequency blocking coil La and a coupling capacitor Ca.

The outer sheath of coaxial cable 9b serves as a (line) antenna for high frequency FM signal and is connected to the radio frequency (RF) output of the transmitter. The inner conductor of the coaxial cable is used for audio signals derived from an audio source, such as a microphone usually associated with this type of transmitter. More specifically, the coaxial cable 9b has an outer conducting portion supplied with high-frequency FM modulated RF output, and an inner conducting portion conducting low frequency audio signal. The high frequency blocking coil La is used for preventing high frequency from entering the low-frequency amplifier 10. La in conjunction with capacitor Cg form a low pass filter that excludes the high frequency RF from the input of amplifier 10.

The low frequency amplifier 10 and logarithmic compression circuit 20 are constructed in a manner similar to those in a conventional system.

The frequency modulator 30 is a modification of the Sabaroff type quartz oscillator and has a crystal resonator Xtal between the base and emitter of a transistor Tr1. The transistor Tr1 is connected at its emitter with a tank circuit 31, the resonant frequency of which is the same as the fundamental frequency of the crystal resonator Xtal, while the collector of the transistor Tr1 is connected with a tank circuit 32 which is tuned to a frequency six times the fundamental frequency of the crystal resonator Xtal. A coupling capacitor C34 and a tank circuit 33 are positioned between the collector of the transistor Tr1 and ground. The tank circuits 32 and 33 form dual tuning. The output frequency from TR1 is supplied through a coupling capacitor 35 to the R.F. power amplifier 60. In the drawing, reference numeral SW2 denotes a "mute" switch.

In the R.F. power amplifier 60, a transistor Tr2 is connected at its collector with a tank circuit 61 which is tuned to twice the frequency applied to the base of the transistor TR2. A coupling capacitor C63 and a tank circuit 62 are positioned between the collector of the transistor and the ground reference. The tank circuits 61 and 60 form two separate tuning means. The power amplifier 60 outputs a frequency modulated signal which is supplied to the outer sheath of the coaxial cable 9a via a coupling capacitor C90. A coil L11 is a low pass filter for letting low frequency components flow to ground reference. In the drawing, reference numerals 100, SW1, 110, 120 denote a compact battery, a power switch, a battery tester and a constant-voltage circuit comprised by a Zener diode, respectively.

The frequency modulator 30 has a tank circuit 31. This circuit 31 helps the crystal resonator Xtal to oscillate at its fundamental frequency, fo. The output of modulator 30 has a frequency six times the fundamental frequency, fo, of Xtal. This is forced by the dual frequency multiplying action of the tank circuits 32, 33. The power amplifier 60 serves to amplify and double the frequency from TR1. Thus, a multiple of 12 times fo frequency can be obtained as in a conventional system.

Figure 1:
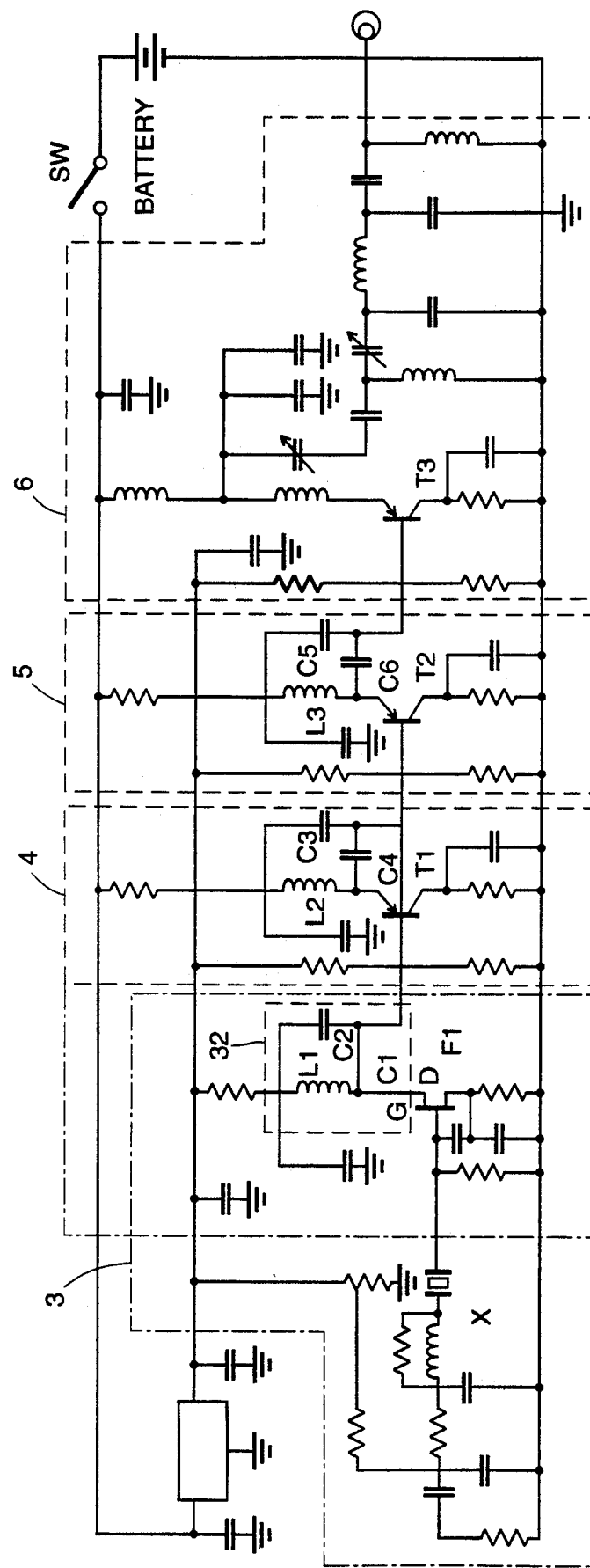
FIG. 1 is a schematic diagram of the prior art, showing a frequency modulator, two stages of frequency doubling circuits and a power amplifier of the FM wireless transmitter of FIG. 2.
Figure 2:
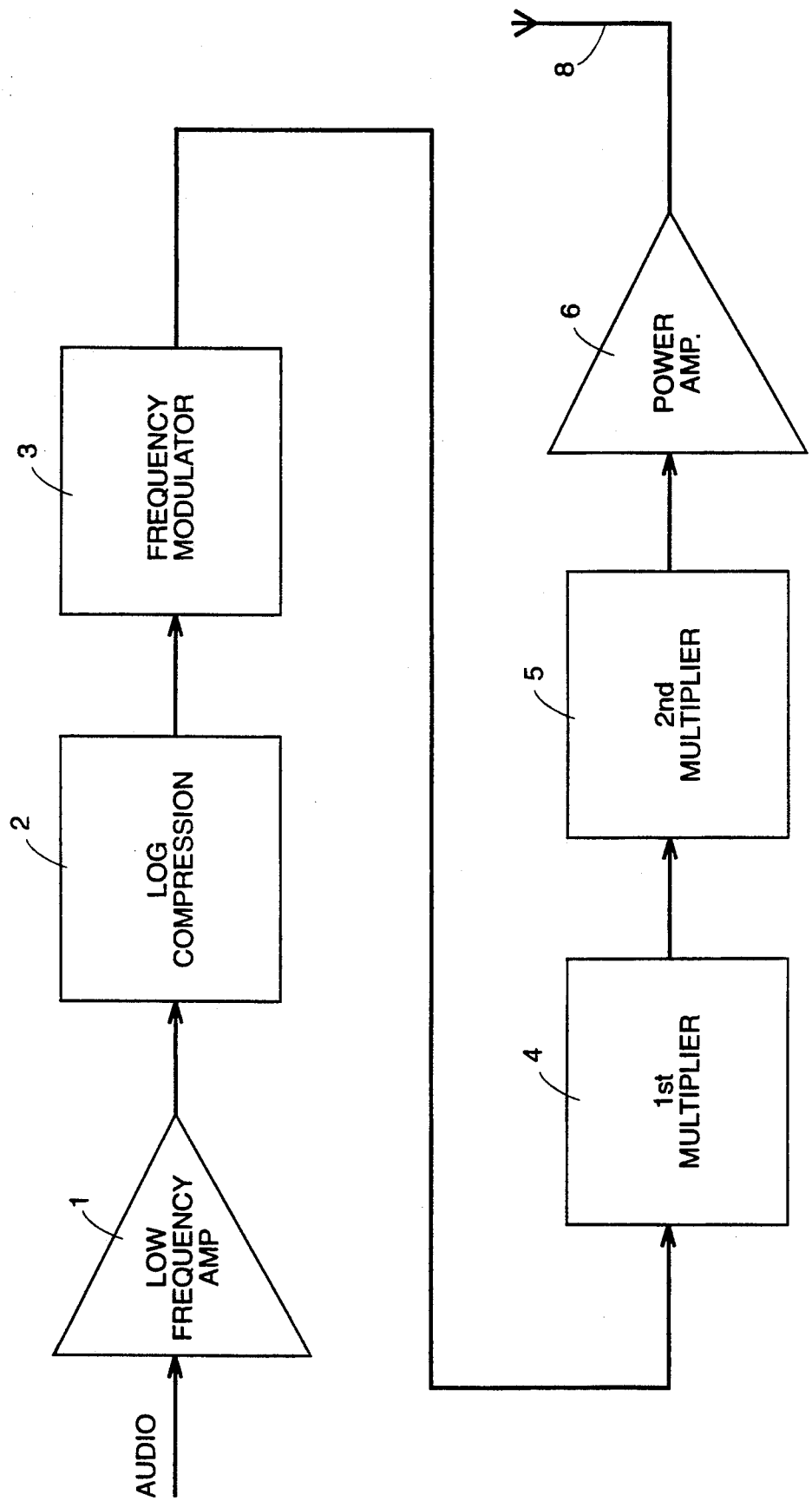
FIG. 2 is a block diagram of a transmitter of a conventional, prior art, wireless microphone system; and, FIG. 3 is a schematic diagram of a transmitter unit of a wireless microphone system according to the present invention where the various building blocks are outlined so as to allow the description of their individual operation.

According to the present invention, the two frequency doubling circuits 4 and 5 shown in FIG. 2 of the prior art are not required. This means that the number of components for manufacturing those two stages can be eliminated without deteriorating the electric characteristics of the transmitter. Parameters such as spurious response can be maintained in the face of a lower parts count. Now, a light and compact transmitter unit having smaller parts count can be cost effectively realized.

Many other modifications and additions from the illustrated embodiments may be made without departing from the spirit or scope of the invention, which is indicated by the appended claims and equivalents thereto.

I claim:

1. A transmitter unit of a frequency modulated wireless microphone system using a frequency modulated carrier comprising an audio amplifier exciting a frequency modulation unit, said frequency modulation unit having an input and an output, said output driving a power amplifier, said frequency modulation unit comprising a crystal resonator, having a natural frequency, connected to the base of an amplifying semiconductor transistor element, a first tuned tank circuit connected to the emitter of said transistor, a second tuned tank circuit connected to the collector of said transistor and a third tuned tank circuit connected to said second tuned tank circuit, wherein said frequency modulation unit output is a six-fold multiple of said natural frequency of said crystal resonator.

2. A transmitter unit as described in claim 1 wherein said first tank circuit is tuned to said natural frequency of said crystal resonator.

3. A transmitter unit as described in claim 1 wherein said second tank circuit is tuned to six times said natural frequency of said crystal resonator.

4. A transmitter unit as described in claim 1 wherein said third tank circuit is tuned to two times said natural frequency of said crystal resonator.

5. A transmitter unit of the frequency modulated wireless microphone system of claim 1 wherein said microphone has a low level output, further comprising a coaxial cable having an inner conductor and an outer sheath, said low level output connected to said inner conductor, said inner conductor connected to said audio amplifier exciting said frequency modulation unit, said frequency modulation unit driving said power amplifier having a radio frequency output, wherein said radio frequency output is fed to said outer sheath of said coaxial cable.

6. The transmitter unit of a frequency modulated wireless microphone system of claim 1 wherein said frequency modulation unit has a first input and a first output, said first output driving the power amplifier, said power amplifier having a second input and a second output, an amplifying semiconductor element connected to a fourth and a fifth tank circuit, wherein said second output is double the frequency of said second input.

7. A transmitter unit as described in claim 6 wherein said fourth tank circuit is tuned to twice the frequency of said second input.

8. A transmitter unit as described in claim 6 wherein said fifth tank circuit is tuned to the same frequency as said fourth tank circuit.

9. A transmitter unit of a frequency modulated wireless microphone system using a frequency modulated carrier having a ground voltage reference point, comprising:
 a) audio signal input means, said audio signal input means comprising the center conductor of a coaxial cable connected to a low pass filter having a first output;
 b) an audio amplifier, connected to said first output from said low pass filter, having a second output;
 c) a logarithmic compression circuit, connected to said second output from said audio amplifier, having a third output;
 d) a frequency modulation unit connected to said third output from said logarithmic compression circuit, having a fourth output, said frequency modulation circuit comprising:
  i) a first transistor, having a first collector, a first emitter and a first base;
  ii) a crystal resonator having a natural frequency, connected to said first base;
  iii) a first tank circuit connected to said first emitter;
  iv) a second tank circuit connected to said first collector;
  v) a first coupling capacitor having a first and second terminal, said first terminal connected to said first collector, said second terminal presenting said fourth output;
  vi) a third tank circuit connected between said second terminal and said ground voltage reference point;
 e) a power amplifier, connected to said fourth output, having a fifth output, comprising:
  i) a second transistor having a second base, a second emitter and a second collector;
  ii) a fourth tank circuit connected to said second collector;
  iii) a second coupling capacitor having a third and a fourth terminal, said third terminal connected to said second collector, said fourth terminal presenting said fifth output;
  iv) a fifth tank circuit connected between said ground reference and said fourth terminal wherein said fifth output represents frequency modulation in response to an audio signal applied to said audio input means of a frequency carrier twelve times that of said natural frequency of said crystal resonator.

10. A transmitter unit as described in claim 9 wherein said first tank circuit is tuned to said natural frequency of said crystal resonator.

11. A transmitter unit as described in claim 9 wherein said second tank circuit is tuned to six times said natural frequency of said crystal resonator.

12. A transmitter unit as described in claim 9 wherein said third tank circuit is tuned to two times said natural frequency of said crystal resonator.

13. A transmitter unit as described in claim 9 wherein said fourth tank circuit is tuned to twice the frequency of said fourth output.

14. A transmitter unit as described in claim 9 wherein said fifth tank circuit is tuned to the same frequency as said fourth tank circuit.

15. A transmitter unit of a frequency modulated wireless microphone comprising antenna means for receiving audio input; audio amplifying means for amplifying said audio input; means for generating a frequency modulated carrier, modulated in response to said audio input; and means for outputting said modulated carrier; wherein said means for generating said frequency modulated carrier comprises a crystal resonator connected to the base of an amplifying semiconductor transistor element, a first tank circuit connected to the emitter of said transistor, and second and third tank circuits connected to the collector of said transistor, and wherein the output of said means for generating said frequency modulated carrier is a six fold multiple of the natural frequency of said crystal resonator.

16. The transmitter unit of claim 15 further comprising means for amplifying said modulated carrier prior to outputting said modulated carrier.

17. The transmitter unit of claim 15 further comprising a coaxial cable having an inner conductor and an outer sheath and wherein said antenna means comprises said outer sheath and said means for outputting said modulated carrier comprises said inner conductor of said cable.

18. The transmitter unit of claim 15 wherein said first tank circuit is tuned to said natural frequency of said crystal resonator, said second tank circuit is tuned to six times said natural frequency of said crystal resonator and said third tank circuit is tuned to two times said natural frequency of said crystal resonator.

* * * * *